United States Patent
Kakutani

(10) Patent No.: US 8,976,382 B2
(45) Date of Patent: Mar. 10, 2015

(54) APPARATUS FOR MANAGING OUTPUT OF ENCODED IMAGE-ADDED DOCUMENT, CONTROL METHOD THEREOF, AND STORAGE MEDIUM

(75) Inventor: Naoya Kakutani, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 68 days.

(21) Appl. No.: 13/347,089

(22) Filed: Jan. 10, 2012

(65) Prior Publication Data

US 2012/0188581 A1  Jul. 26, 2012

(30) Foreign Application Priority Data

Jan. 25, 2011  (JP) ................ 2011-013028

(51) Int. Cl.
G06K 15/00 (2006.01)
H04N 1/00 (2006.01)
(52) U.S. Cl.
CPC ....... *H04N 1/00875* (2013.01); *H04N 1/00846* (2013.01); *H04N 2201/0098* (2013.01); *H04N 2201/0094* (2013.01)
USPC ........... 358/1.14; 358/1.1; 358/1.9; 358/3.28; 358/468; 358/1.15
(58) Field of Classification Search
CPC ................................. G06K 7/10881
USPC ............. 358/1.14, 1.1, 3.28, 1.9, 1.15, 468
See application file for complete search history.

(56) References Cited

U.S. PATENT DOCUMENTS

| | | | |
|---|---|---|---|
| 2002/0005950 A1* | 1/2002 | Beimers et al. | 356/402 |
| 2005/0111039 A1* | 5/2005 | Yoshida | 358/1.16 |
| 2005/0188205 A1* | 8/2005 | Alasia et al. | 713/176 |
| 2007/0177824 A1* | 8/2007 | Cattrone et al. | 382/306 |
| 2009/0268259 A1* | 10/2009 | Kikuchi | 358/468 |
| 2010/0060923 A1* | 3/2010 | Kakutani | 358/1.14 |

FOREIGN PATENT DOCUMENTS

JP  H04-009963 A  1/1992

* cited by examiner

*Primary Examiner* — Martin Mushambo
(74) *Attorney, Agent, or Firm* — Carter, DeLuca, Farrell & Schmidt, LLP

(57) ABSTRACT

In a digital multifunction peripheral having a function of preventing unauthorized duplication, a situation is prevented in which a document to which encoded images having contradictory contents are added is created. An apparatus having a control unit configured to perform detection processing of an encoded image for a document image and add a different encoded image to a document image form which an encoded image is detected by the detection processing and output the document image, characterized in that the control unit does not perform output of a document image to which the different encoded image is added upon receipt of an instruction not to perform the detection processing from a user.

32 Claims, 19 Drawing Sheets

```
┌─────────────────────────────────────────────────────────┐
│ OPERATION RESTRICTION SETTING AT THE TIME OF            │
│ [DISABLE] IN QR CODE DETECTION SETTING                  │
├─────────────────────────────────────────────────────────┤
│                                                         │
│   801~●  MASK OUTPUT SECURITY SETTING SCREEN            │
│                                                         │
│   802~○  CANCEL OUTPUT WHEN QR CODE ADDITION IS SET     │
│                                                         │
│   803~○  SET QR CODE DETECTION SETTING AS               │
│          [ENABLE] WHEN QR CODE ADDITION IS SET          │
│                     804                    805          │
│              ┌──────────┐            ┌──────────┐       │
│              │    OK    │            │  CANCEL  │       │
│              └──────────┘            └──────────┘       │
└─────────────────────────────────────────────────────────┘
```

FIG.8

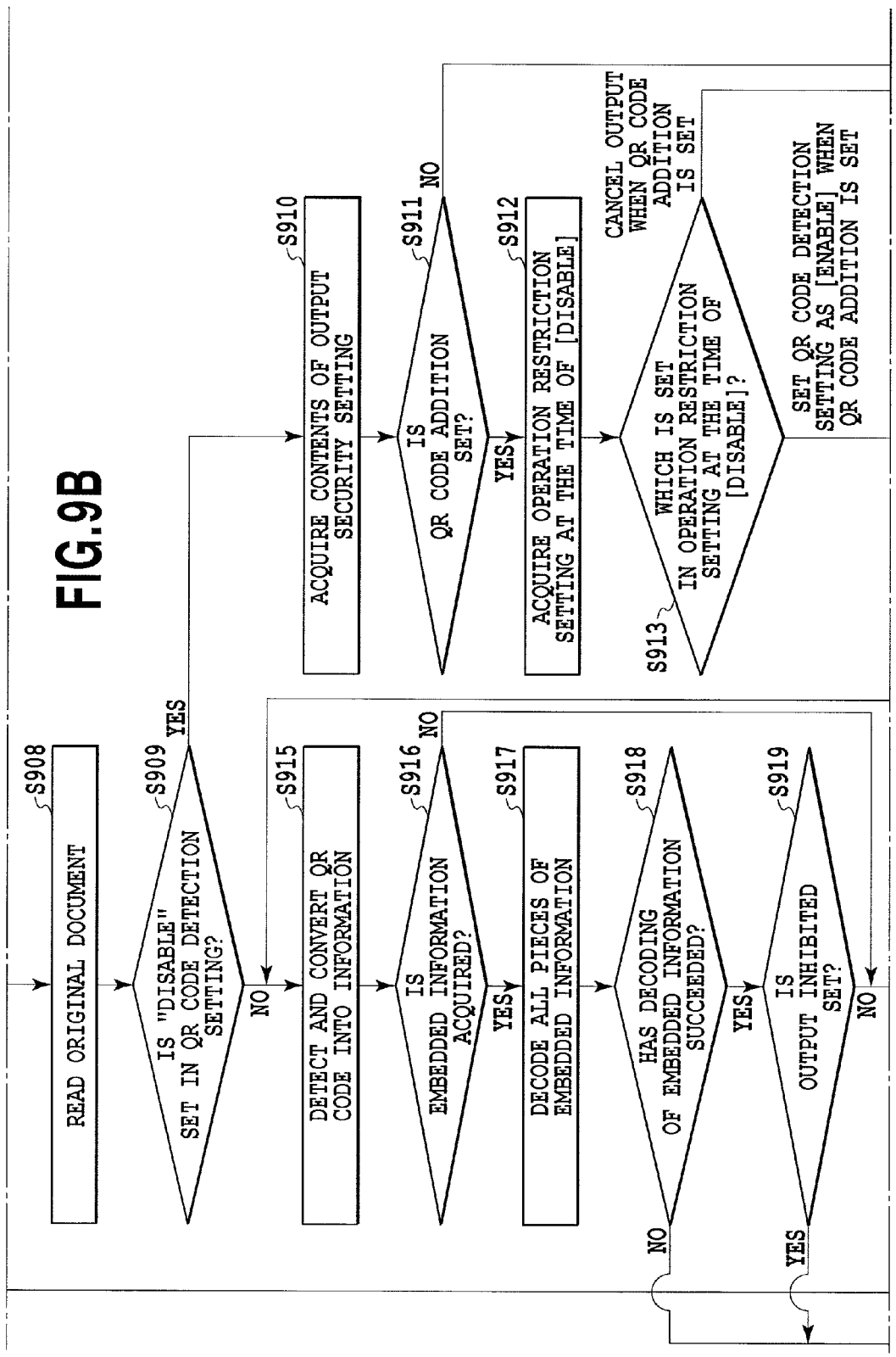

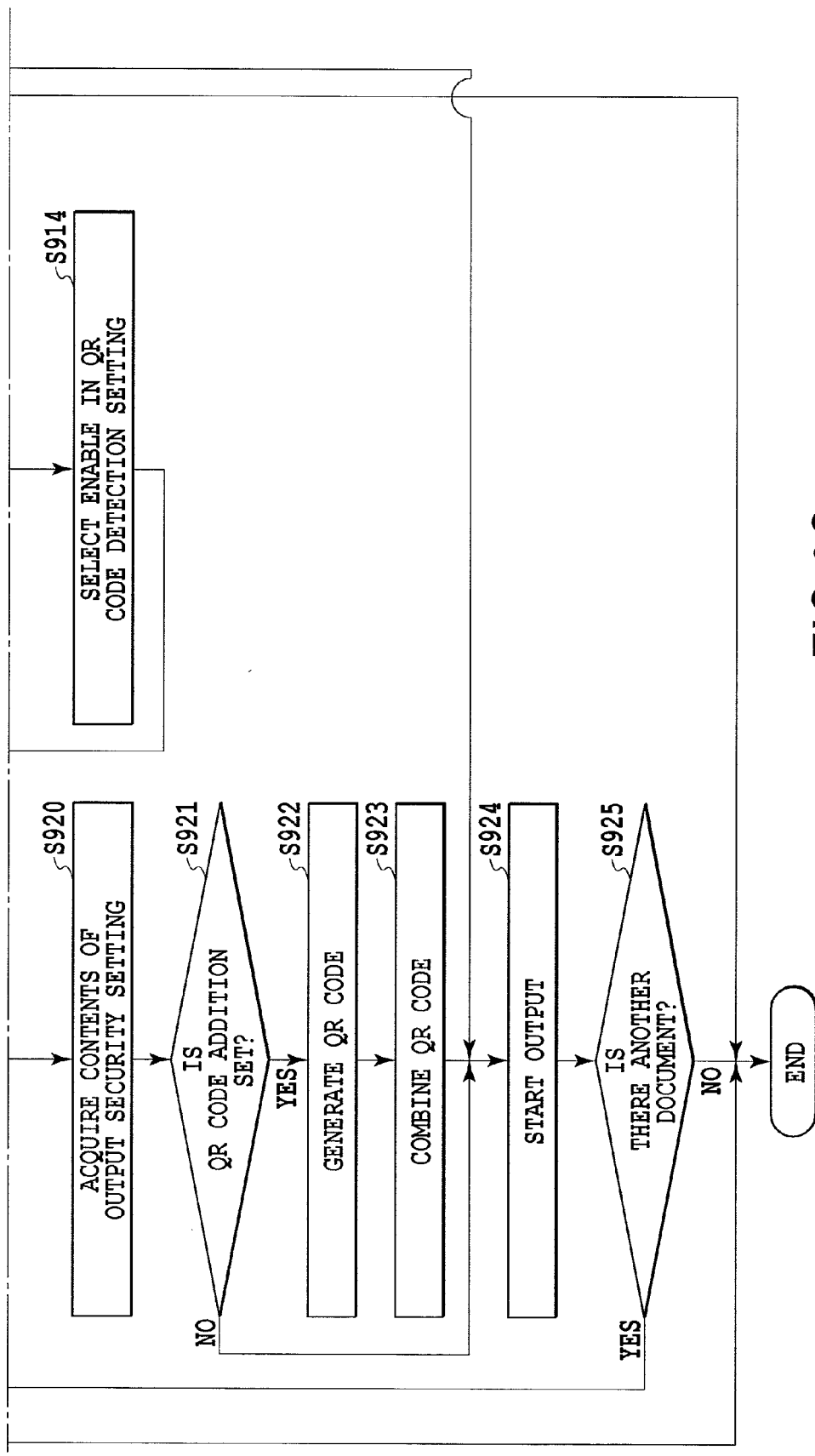

"OUTPUT IS PERFORMED WHILE THE CONTENTS OF OUTPUT
CONTROL INFORMATION ARE [OUTPUT PROHIBITED]. OK?"

| YES | NO |

FIG.13

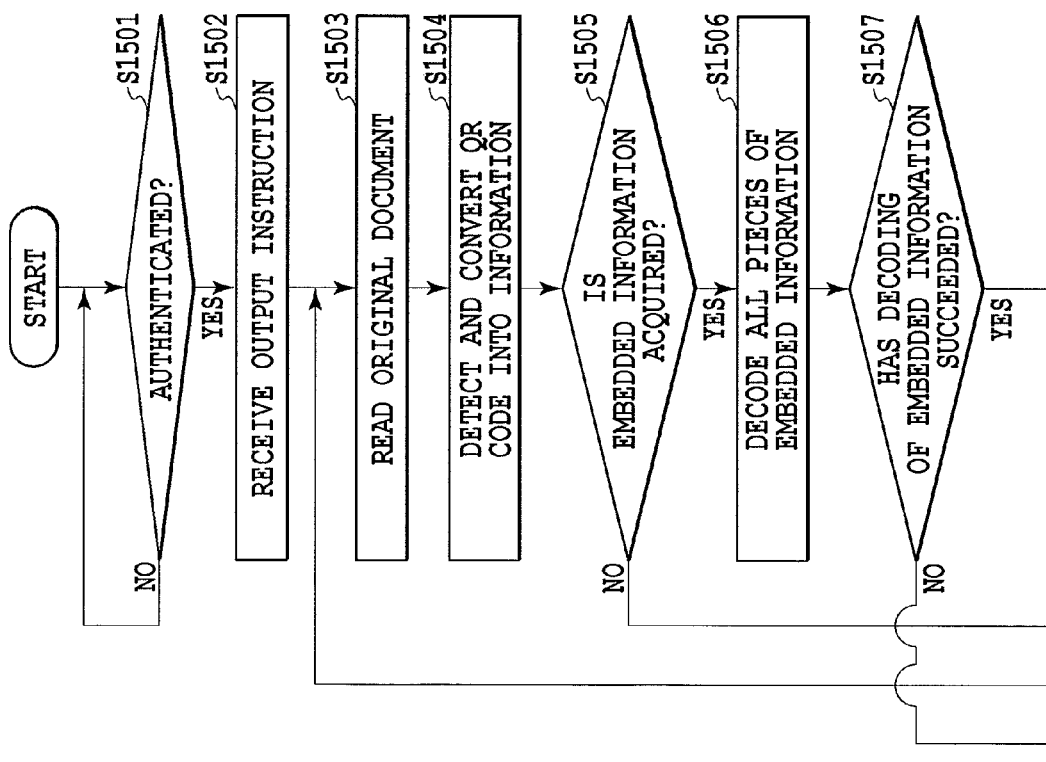

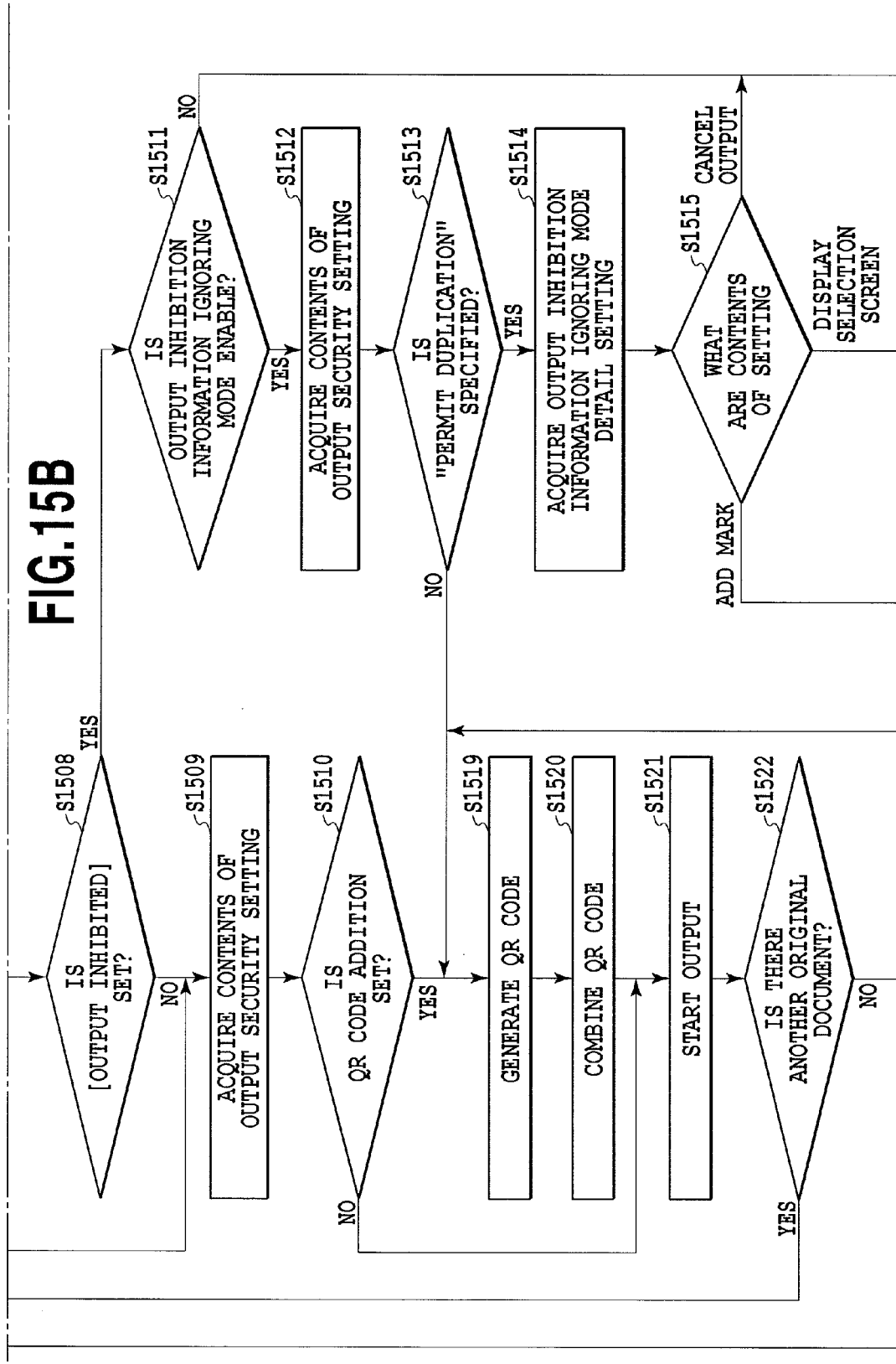

APPARATUS FOR MANAGING OUTPUT OF ENCODED IMAGE-ADDED DOCUMENT, CONTROL METHOD THEREOF, AND STORAGE MEDIUM

BACKGROUND OF THE INVENTION

1. Field of the Invention

The present invention relates to an apparatus capable of managing output of a document by an encoded image including output control information, a control method thereof, and a storage medium.

2. Description of the Related Art

In recent years, along with the spread of the digital multifunction peripheral (MFP), the problem of unauthorized duplication of a document has been increasing. As a countermeasure against such unauthorized duplication of a document, a technique for restricting duplication of a specific document has been proposed hitherto. For example, Japanese Patent Laid-Open No. 04-009963 discloses a method for inhibiting duplication of a document by adding a barcode including duplication inhibition information to the document and reading the barcode when the document is duplicated by a copy machine.

The recent digital multifunction peripheral includes various output functions such as BOX storage and E-mail/FAX transmission, besides duplication. Consequently, unauthorized outputs of documents are dealt with by adding an encoded image (for example, QR Code®) including information for controlling outputs in various forms, to documents. The information for controlling output of a document (hereinafter, referred to as "output control information") may be "output permission information" indicative of that output of duplication etc. is permitted besides "output inhibition information" indicative of that output of duplication etc. is inhibited.

However, there is a case where it is desired to allow output of a document depending on circumstances even if an encoded image including the above-described output inhibition information is added to the document. For example, when an administrator having the right to permit or inhibit duplication etc. permits duplication of a document, it is desirable to allow duplication of the document. Consequently, for example, a proposal to meet such a request has been made, in which an operation mode of not performing detection of an encoded image or an operation mode of ignoring output inhibition information is provided and only an administrator is allowed to make settings of these operation modes.

For example, it is assumed that a user makes settings for adding an encoded image to a document to be output under circumstances in which an administrator sets the operation mode of not performing detection of an encoded image in an image forming apparatus including the above-mentioned operation mode. In this operation mode, even if an encoded image is added, it is not detected, and thus there is a possibility that the original encoded image is overwritten with a new encoded image or a new encoded image is added at a position different from the position of the original encoded image in image data to be output as a result. If the encoded image is replaced with a new one or two or more encoded images exist in one document, various problems may happen. For example, it is possible to include tracking information for tracking an output history of a document in an encoded image, but if it is overwritten, information on the original creator of the document included in the original encoded image is lost, and thus it is no longer possible to accurately track the output history of the document. Furthermore, when a new encoded image is added at a position different from the original position, for example, the contents of output control information in two encoded images are contradictory to each other, such as that one encoded image includes output inhibition information and the other includes output permission information, and thus, it is no longer possible to control the output of the document by the encoded image.

Furthermore, for example, it is assumed that a user sets the contents of output control information of an encoded image to be added to a document to be output to "output permission information" under circumstances where an administrator sets the operation mode of ignoring output inhibition information. In this case, if the output control information of the original encoded image is "output inhibition information", two encoded images each having output control information contradictory to each other exit on the document to be output when overwrite is not performed. In this case also, a state is brought about where it is no longer possible to control the output of the document by the encoded image.

The present invention has been made to address such problems.

SUMMARY OF THE INVENTION

In order to solve the above-mentioned problems, the present invention is an apparatus having a control unit configured to perform detection processing of an encoded image for a document image and add a different encoded image to a document image from which an encoded image is detected by the detection processing and output the document image, characterized in that the control unit does not perform output of the document image to which the different encoded image is added upon receipt of an instruction not to perform the detection processing from a user.

According to the present invention, it is possible to manage output of an encoded image-added document without causing the above-described problems in an apparatus including a function of performing output control of a document by an encoded image.

Further features of the present invention will become apparent from the following description of exemplary embodiments (with reference to the attached drawings).

BRIEF DESCRIPTION OF THE DRAWINGS

FIG. 8 is a diagram showing an example of an Operation Restriction Setting screen at the time of [Disable] in QR Code Detection Setting;

FIG. 9B is a flowchart showing a flow of control processing of an output operation of an image forming apparatus according to a first embodiment;

FIG. 9C is a flowchart showing a flow of control processing of an output operation of an image forming apparatus according to a first embodiment;

FIG. 13 is a diagram showing an example of a selection screen in a second embodiment;

FIG. 15 is a diagram showing the relationship of FIGS. 15A to 15C;

FIG. 15A is a flowchart showing a flow of control processing of an output operation of an image forming apparatus according to the second embodiment;

FIG. 15B is a flowchart showing a flow of control processing of an output operation of an image forming apparatus according to the second embodiment.

DESCRIPTION OF THE EMBODIMENTS

Hereinafter, preferred embodiments of the present invention will be explained based on the accompanying drawings. In the present specification, an explanation will be given b taking, as an example, a case in which an encoded image is a two-dimensional code (more specifically, a QR code, which is a typical two-dimensional code). However, the application range of the present invention is not limited to the QR code.

First Embodiment

First, an image forming apparatus when an operation mode of not detecting a QR code is set will be explained as a first embodiment.

Here, the techniques of "encoding of output control information" and "extraction of output control information", which function as a premise for the present invention, will be explained briefly.

Encoding of output control information means a series of processing from encoding of output control information to formation of an image. That is, a QR code is created by, first, adding an error correction code to output control information being the original information to generate (encode) embedded information, and then forming the generated embedded information into an image. Subsequently, a QR code-added document is completed by combining the generated QR code with image data of the document and performing printing processing by using the combined image data of the document.

Extraction of output control information is a series of processing from detection of a QR code from image data (hereinafter, referred to as "document image") obtained by reading a document, to acquisition of output control information. In order to extract output control information, first, a document to which a QR code is added is read and a document image is generated. Next, a QR code is detected from the obtained document image. Then, the detected QR code is converted into information and thus embedded information is obtained. Finally, by decoding the embedded information, output control information is obtained.

As long as the QR code is not broken due to stain etc., the contents of embedded information generated by encoding output control information and the contents of embedded information obtained by converting the QR code into information agree with each other.

(Internal Configuration of Image Forming Apparatus)

Figure 1:
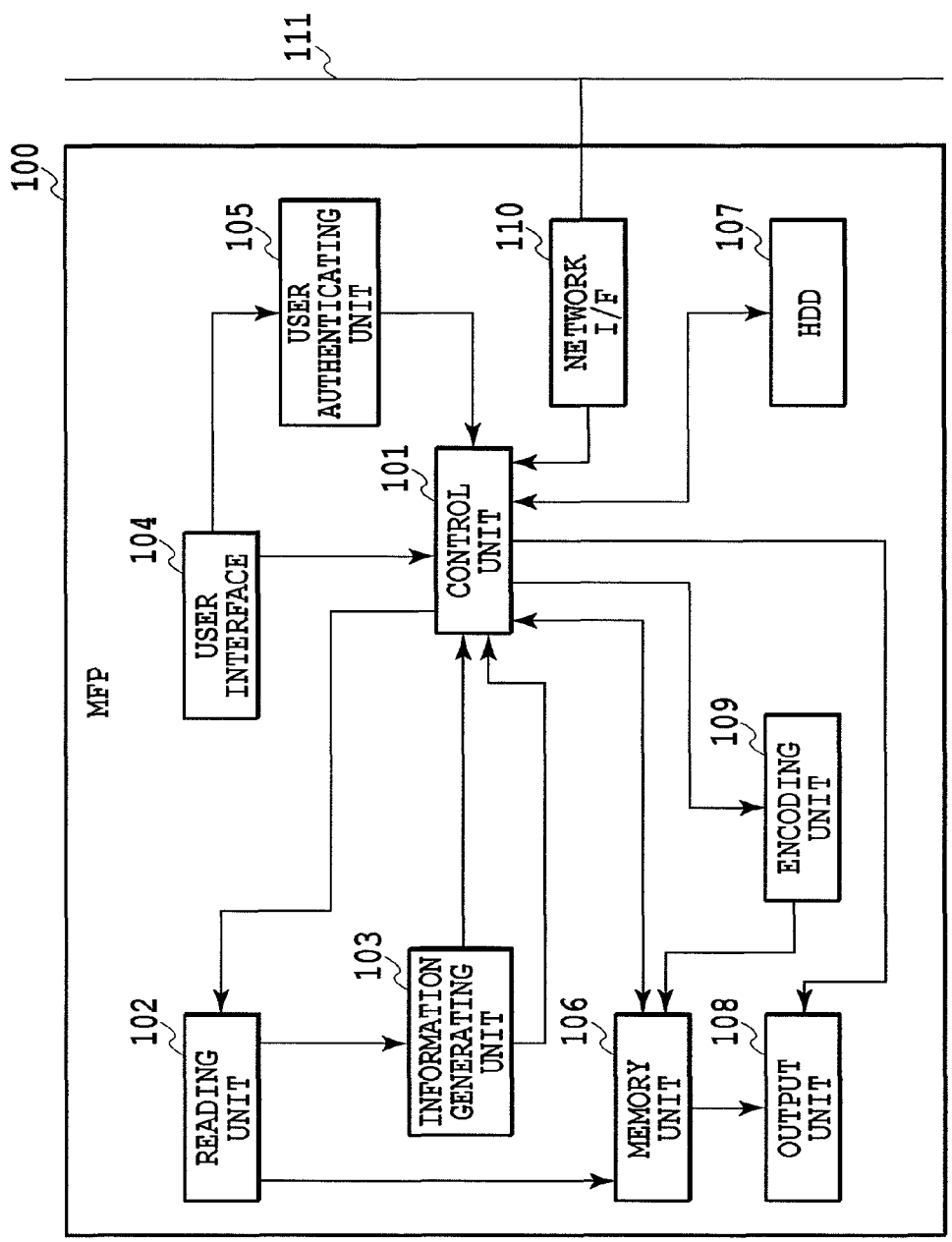
FIG. 1 is a block diagram showing an example of an internal configuration of an image forming apparatus.

FIG. 1 is a block diagram showing an example of an internal configuration of an MFP 100 as an image forming apparatus according to the present embodiment.

Reference numeral 101 denotes a control unit that totally performs operation control of each unit, to be described later. The control unit 101 has a CPU not shown schematically. Furthermore, the control unit 110 performs processing to extract the original information on output control by decoding embedded information.

Reference numeral 102 denotes a reading unit (scanner unit) that generates image data (document image) of a document by reading the document (hereinafter, referred to as the "original document"), which is a target of processing such as duplication printing, set on a document table or ADF (Auto Document Feeder), not shown schematically. While the original document is a paper document such as printed matter, the document image is digital data. The document image (image data) generated by the reading unit 102 is provided to various outputs such as duplication.

Reference numeral 103 is an information generating unit that performs processing to search for (detect) a QR code from the generated document image and extract embedded information from the detected QR code. The extraction of embedded information from a QR code can be represented as processing to convert image information into information of 0, 1 (binary data). Detection of a QR code from a document image is performed by detecting a cut-out symbol (finder pattern) located in the corners (three corners at the upper-right, upper-left, and lower-left parts) of a QR code in a predetermined region within a document image. In the present embodiment, the predetermined region within a document image is a rectangular region provided in the upper-left corner, lower-left corner, upper-right corner, and lower-right corner of the document image and the length of each side in the longitudinal and transverse directions is, for example, 30 mm.

Reference numeral 104 denotes a user interface including an operation unit that receives an operation input to the MFP 100 from a user and a display unit that displays various pieces of information to outside.

Reference numeral 105 denotes a user authenticating unit that authenticates a user who uses the MFP 100. Specifically, the user authenticating unit 105 performs processing to confirm the presence/absence of the right of a user by collating each piece of user information that is managed with a user ID and password that are input. Meanwhile, it may also be possible to authenticate a user by means of an external user authentication server (not shown schematically) connected via a network 110.

Reference numeral 106 denotes a memory unit including an RAM for temporarily storing generated document images and contents of various settings and a ROM for storing programs to execute various kinds of processing, to be described later. Furthermore, the memory unit 106 includes an image combining unit that combines a document image and a QR code.

Reference numeral 107 denotes an HDD that stores contents of various settings and use logs in the MFP 100 and at the same time, the HDD further serves as a storage destination when BOX-storing a document image.

Reference numeral 108 denotes an output unit that performs output, such as duplication printing and BOX storing, of a document image according to the instruction of a user. Meanwhile, as an output destination of BOX storing, for example, a storage of an external apparatus (not shown schematically) such as a PC, connected with the MFP 100 via the network 110, may be used besides the above-described HDD 107.

Reference numeral 109 denotes an encoding unit that performs processing for generating embedded information by encoding output control information, which is the original information, and further for forming embedded information into an image to generate a QR code. Furthermore, the encoding unit 109 also performs processing for updating information necessary to track the history of an output (hereinafter, referred to as "tracking information") at the time of QR code generation processing. The tracking information includes "original information" about a user who has first created a document (who has first added a QR code) and "latest information" about a user who has performed previous output, which is the second or subsequent output of the document. Then, at the time of update, the latest information is replaced with new contents. Specific contents of tracking information include information such as the user name or mail address of a user who has instructed to perform output, date of output, serial number of the used MFP, and kind of output (job). In the following explanation, although reference to tracking information is omitted in some cases for the sake of convenience, tracking information also configures part of embedded information along with output control information, and thus tracking information is a target of extraction, decoding, encoding, and image formation of embedded information in the information generating unit 103 described earlier.

Reference numeral 110 denotes a network I/F, which is a network interface used when image data etc. is transmitted/received to/from an external apparatus.

Reference numeral 111 is a network such as LAN, which connects an external apparatus, not shown schematically, and the MET 100.

(Addition Setting of QR Code)

Next, processing for performing addition setting of a QR code including the above-described output control information will be explained. This processing is realized by the CPU within the control unit 101 executing programs read from the ROM into the RAM.

Figure 2:
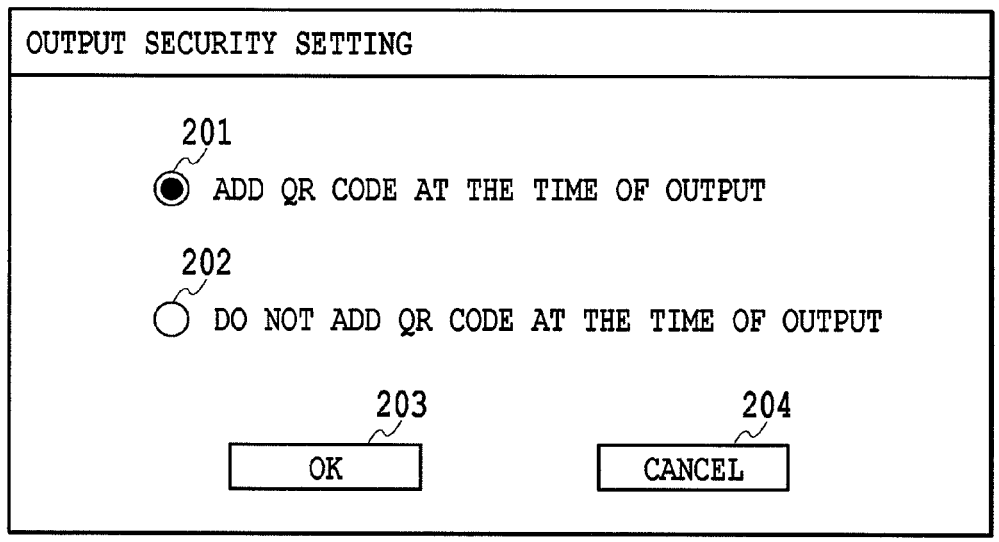
FIG. 2 is a diagram showing an example of a basic screen of Output Security Setting.

A user wishing to add a QR code to a document image to be output selects a button (not shown schematically) to perform "Output Security Setting" on the user interface 104. In response to this, the control unit 101 displays a screen (basic screen of "Output Security Setting") on which either "Add QR code" or "Don't add QR code" can be selected on the user interface 104. FIG. 2 shows an example of a basic screen of Output Security Setting. When wishing to add a QR code to a document image, a user checks a check button 201 of "Add QR code at the time of output" and presses an OK button 203. Meanwhile, in the present embodiment, a check box 202 of "Don't add QR code at the time of output" is checked as a default. Because of this, even if "Add QR code at the time of output" is selected, the Output Security Setting automatically returns to the setting of not adding QR code when output relating to the selection is terminated.

Figure 3:
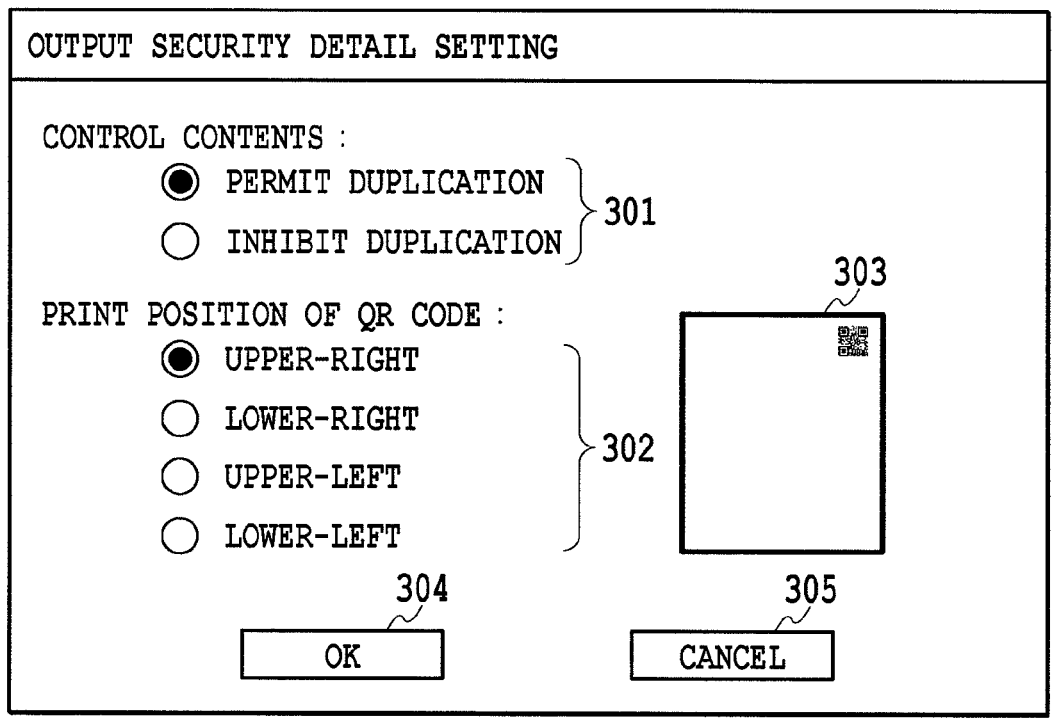
FIG. 3 is a diagram showing an example of an Output Security Detail Setting screen.

When the check box 201 of "Add QR code at the time of output" is selected and the OK button 203 is pressed, an "Output Security Detail Setting" screen which specifies details about the kind of QR code to be added is displayed on the user interface 104. FIG. 3 shows an example of the Output Security Detail Setting screen. The user selects either "Permit duplication" or "Inhibit duplication" as the contents of control of output control information using a check button 301. When "Inhibit duplication" is selected, a QR code including information for instructing to inhibit output such as duplication, as output control information is generated. In contrast, when "Permit duplication" is selected, a QR code including information for instructing to permit output such as duplication, as output control information is generated. Meanwhile, "Duplication" in this case means all the output functions possessed by the MFP 100, such as storing in a storage in BOX storing and data transmission to an external apparatus such as a facsimile machine, in addition to duplication printing in a narrow meaning.

The user further specifies the position of the QR code to be added to the document image through the use of a check button 302. In the example in FIG. 3, one of "Upper-right", "Lower-right", "Upper-left", and "Lower-left" is selected and specified for the document image. It is possible for the user to confirm the print position selected by the user through the use of a print position confirmation image 303 located on the right-lateral side of the check button 302 as a visual image. When the user having confirmed the setting contents presses an OK button 304, the contents of Output Security Setting are settled (the setting contents are stored in the RAM of the memory unit 103) and are reflected in the document image at the time of output.

On all the documents created by one-time duplication printing, a QR code including the same output control information is printed. Consequently, for example, when a user places four sheets of document on the ADF and instructs the MFP 100 to duplicate three copies, a QR code including the same output control information is printed on all the three copies of duplicated matter to be created (4 sheets×3 copies=12 sheets).

The setting of addition of a QR code is performed as described above, but it may also be possible to perform the same setting on the driver or utility of a PC, not shown schematically, connected with the MFP 100 via the network 111.

(Creation of QR Code-Added Document Image)

Next, processing in creating a QR code-added document image will be explained. It should be noted that this processing is also realized by the CPU within the control unit 101 executing programs read from the ROM into the RAM.

Figure 4:
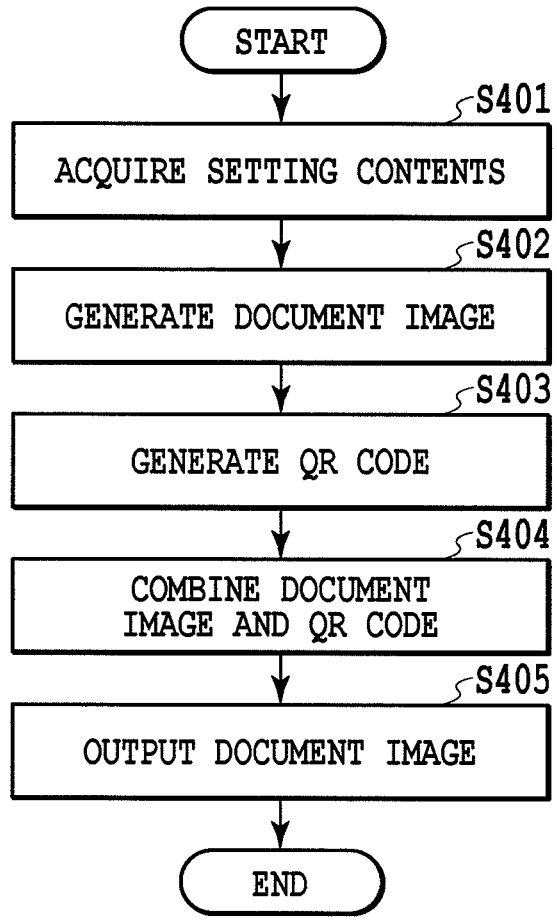
FIG. 4 is a flowchart showing a flow of creation processing of a QR code-added document image.

FIG. 4 is a flowchart showing a flow of creation processing of a QR code-added document image.

First, in step 401, the encoding unit 109 acquires the contents of Output Security Setting.

In step 402, the reading unit 102 generates a document image based on an instruction from a user. For example, when the output instruction from the user is duplication printing using the original document set on the document table of the MFP 100, the reading unit 102 generates a document image by scanning the original document set on the document table according to the read instruction from the control unit 101. The generated document image is sent to the memory unit 106 for temporary storage.

In step 403, the encoding unit 109 generates a QR code by further forming embedded information into an image after updating the above-described tracking information, and generating the embedded information by encoding output control information according to the setting contents acquired in step 401. The generated QR code is sent to the memory unit 106 for temporary storage.

Figure 5:
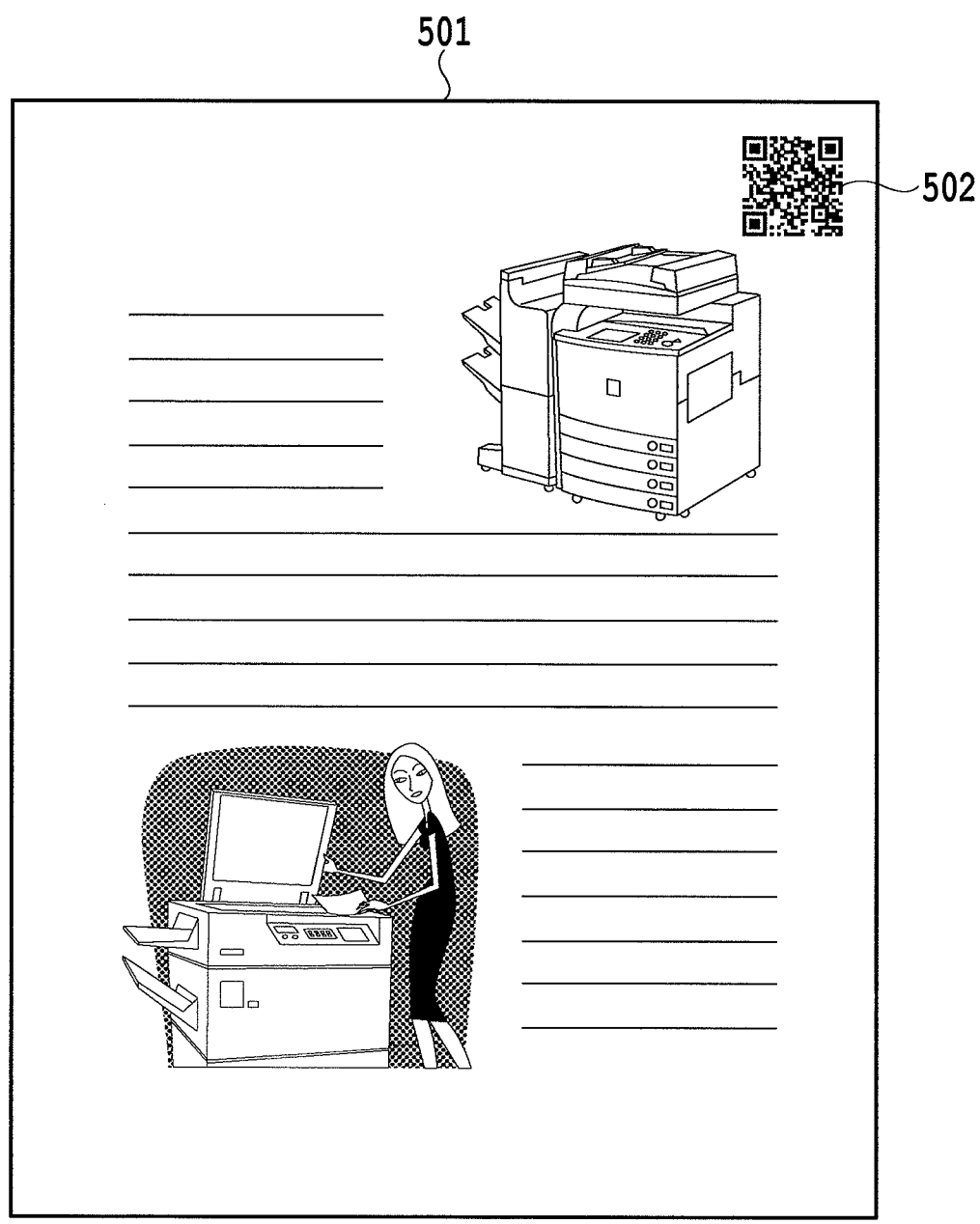
FIG. 5 is a diagram showing an example of a document image with which a QR code is combined.

In step 404, the memory unit 106 combines the QR code at the position specified in Output Security Setting and generates a QR code-added document image. FIG. 5 is a diagram showing an example of a document image with which a QR code is combined. A QR code 502 is added to the upper-right corner of a document image 501. The document image with which the QR code is combined is sent to the output unit 108 and is output therefrom.

In step 405, the output unit 108 outputs the document image through the use of the output contents specified by the user (for example, duplication printing).

(Setting of Operation Mode of Disabling Detection of QR Code)

Next, the setting of the operation mode of disabling detection by the information generating unit 103 even when a QR code exists on the original document will be explained. This operation mode is intended to be used when it is desirable to allow duplication of even a document to which a QR code including output inhibition information is added, such as when an administrator him/herself having the right duplicates the document as described in "Problem to be solved by the invention".

Figure 6:
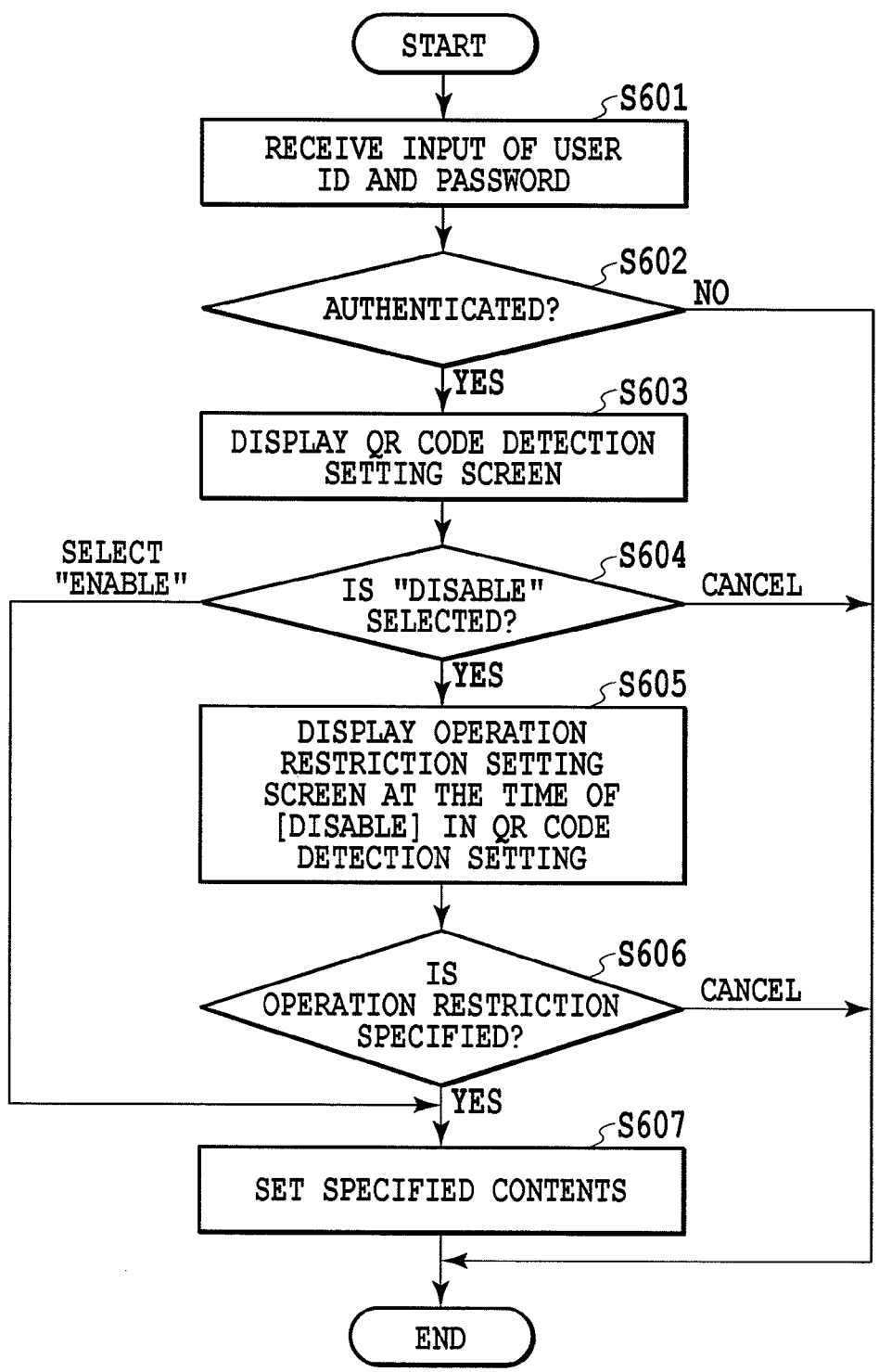
FIG. 6 is a flowchart showing a flow of setting processing of an operation mode of not detecting a QR code.

FIG. 6 is a flowchart showing a flow of processing to set the operation mode of disabling detection even when a QR code exists on the original document. Meanwhile, this processing is also realized by the CPU within the control unit 101 executing programs read from the ROM into the RAM.

A specific user (administrator) having the right to set the operation mode selects a screen for making the setting on the user interface 104. In response to this, in step 601, the control unit 101 displays a screen (not shown schematically) to prompt the user to input a user ID and password to the display unit of the user interface 104 and receives an input by the user. The input information is sent to the user authenticating unit 105.

In step 602, the user authenticating unit 105 performs user authentication by using the input user ID and password, and determines whether or not the user is an appropriate user having the right to change the contents of QR Code Detection Setting. When the user is determined to be an appropriate user having the right, the user authenticating unit 105 transmits the user ID and password to the control unit 101 and the procedure proceeds to step 603. When the user is determined to be a user not having the right, the processing is exited.

Figure 7:
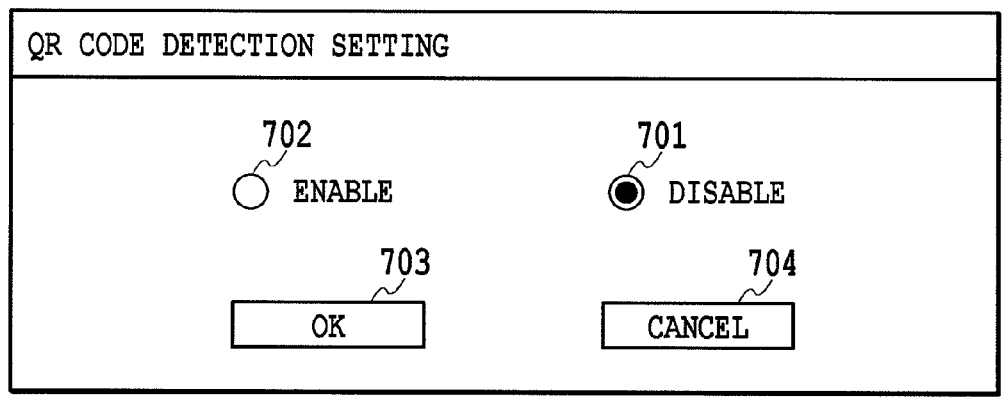
FIG. 7 is a diagram showing an example of a QR Code Detection Setting screen.

In step 603, the control unit 101 displays a "QR Code Detection Setting" screen on which to specify whether or not to detect a QR code on the display unit of the user interface 104. FIG. 7 shows an example of the QR Code Detection Setting screen. When wishing to set the operation mode of not detecting a QR code, the user checks a check box 701 of "Disable" and presses an OK button 703 because a check box 702 of "Enable" is checked as a default.

In step 604, the control unit 101 determines whether or not the check box 701 of "Disable" is selected. When "Disable" is selected, the procedure proceeds to step 605 and when "Enable" is selected, the procedure proceeds to step 607. In contrast, when a "Cancel" button 704 is selected, this processing is exited.

In step 605, the control unit 101 displays an "Operation Restriction Setting at the time of [Disable] in QR Code Detection Setting" screen for specifying the operation restriction in the operation mode of not detecting a QR code on the display unit of the user interface 104 and receives specification by the user.

FIG. 8 shows an example of the Operation Restriction Setting screen at the time of [Disable] in QR Code Detection Setting. It is possible for the user to specify the operation restriction in the mode of not detecting a QR code as follows by selecting any of check buttons 801 to 803.

When "Mask Output Security Setting screen" of the check button 801 is selected, the current display of the Output Security Setting screen is masked (grayed out), and thus the user is no longer able to operate the Output Security Setting screen. That is, while QR Code Detection Setting is set as Disable, the contents of Output Security Setting are fixed to "Don't add QR code at the time of output", which is a default, and the setting operation by the user is disabled.

When "Cancel output when QR code addition is set" of the check button 802 is selected, if "Add QR code at the time of output" is selected on the Output Security Setting screen, all the output operations are aborted. That is, while QR Code Detection Setting is set as Disable, whenever "Add QR code at the time of output" is selected in Output Security Setting, all the outputs such as duplication, are disabled.

When "Set QR Code Detection Setting as [Enable] when QR code addition is set" of the check button 803 is selected, if "Add QR code at the time of output" is selected on the Output Security Setting screen, the detection setting of a QR code is switched temporarily to "Enable". That is, in a state where QR Code Detection Setting is set as Disable, when "Add QR code at the time of output" is selected in Output Security Setting, output such as duplication is enabled, if the contents of output control information are [output permitted]. In contrast, in the case of [output inhibited], all the outputs are disabled.

In step 606, the control unit 101 determines whether or not Operation Restriction Setting at the time of [Disable] in QR Code Detection Setting is specified. Specifically, the control unit 101 determines whether or not any of the check buttons 801 to 803 is checked and an OK button 804 is pressed. When the operation restriction is specified, the procedure proceeds to step 607. In contrast, when a Cancel button 805 is pressed, this processing is exited.

In step 607, the control unit 101 sets each item relating to QR Code Detection Setting according to the contents specified by the user and stores the settings in the HDD 107. For example when "Disable" is selected in step 604 and "Mask Output Security Setting screen" is specified in step 606, the setting contents with which the Output Security Setting screen is grayed out are stored while Disable is set in QR Code Detection Setting.

Unlike in the case of Output Security Setting described earlier, once set, the contents of QR Code Detection Setting are maintained until the setting contents are changed by a user having the right the next time.

As described above, the operation mode of disabling detection of a QR code is set.

(Control Processing of Output Operation)

Next, control processing of the output operation in the image forming apparatus according to the present embodiment will be explained.

Figure 9:
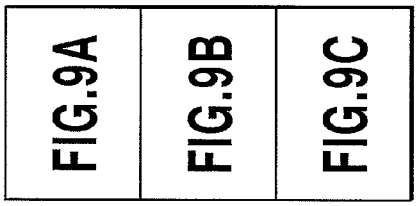
FIG. 9 is a diagram showing the relationship of FIGS. 9A to 9C.
Figure 9A:
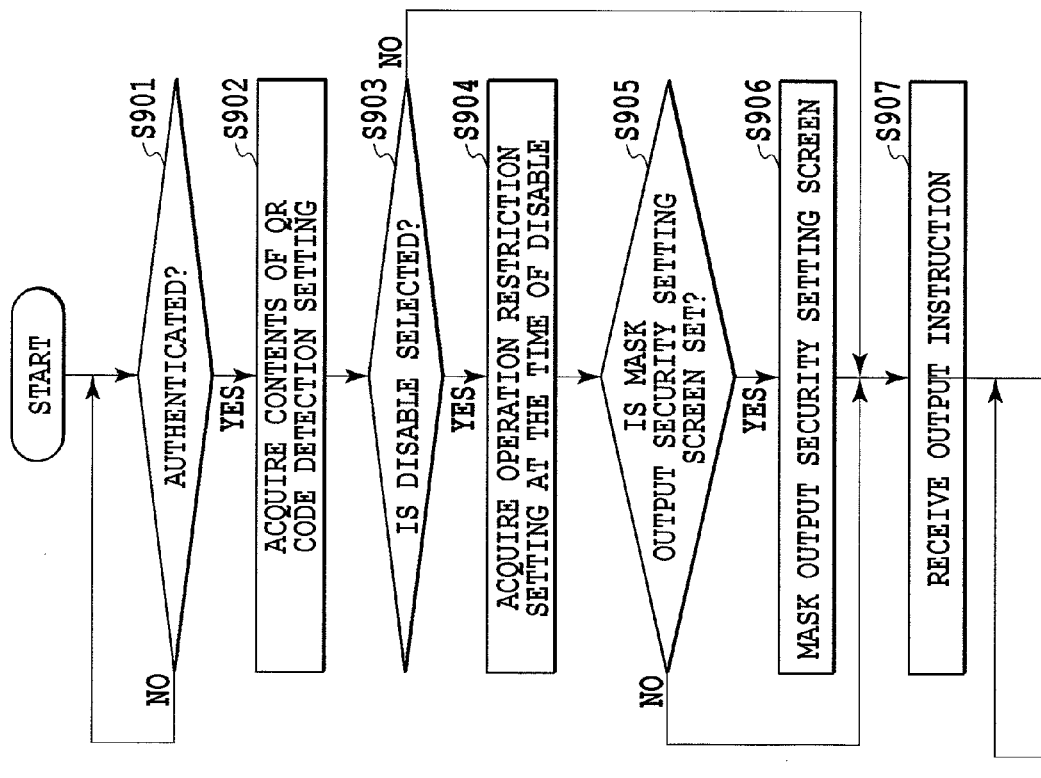
FIG. 9A is a flowchart showing a flow of control processing of an output operation of an image forming apparatus according to a first embodiment.

FIGS. 9A to 9C are flowcharts showing a flow of control processing of the output operation. This processing is also realized by the CPU within the control unit 101 executing programs read from the ROM into the RAM.

First, it is necessary for a user wishing to duplicate a document or take other actions to log in the image forming apparatus 100 via the user interface 104. Because of this, the control unit 101 performs user authentication processing in step 901. Specifically, the control unit 101 sends the user ID and password input through the user interface 104 to the user authenticating unit 105 and instructs the user authenticating unit 105 so as to perform login authentication processing. When the login authentication results in NG, the same processing is repeated until appropriate user ID and password are input. When the login authentication is determined to be OK, the procedure proceeds to step 902.

In step 902, the control unit 101 reads and acquires the contents of QR Code Detection Setting described earlier from the HDD 107.

In step 903, the control unit 101 determines whether or not the acquired contents of QR Code Detection Setting are "Disable". When the contents are determined to be "Disable", the procedure proceeds to step 904. In contrast, when the contents are determined to be "Enable", the procedure proceeds to step 907.

In step 904, the control unit 101 reads and acquires the contents of Operation Restriction Setting at the time of [Disable] in QR Code Detection Setting, from the HDD 107.

In step 905, the control unit 101 determines whether or not the acquired contents of Operation Restriction Setting at the time of [Disable] is "Mask Output Security Setting screen". When "Mask Output Security Setting screen" is set, the procedure proceeds to step 906. In contrast, when the setting contents are other than "Mask Output Security Setting screen", the procedure proceeds to step 907.

In step 906, the control unit 101 sets so that the display of the Output Security Setting screen is masked when the screen is displayed on the display unit of the user interface 104, and thus "Add QR code at the time of output" is no longer selected from now on. As a result, the state where "Don't add QR code at the time of output" is set, which is the default, is maintained and the occurrence of a situation in which two QR codes are printed on a document image is prevented. When the mask display setting of the Output Security Setting screen is terminated, the procedure proceeds to step 907.

In step 907, the control unit 101 receives an output instruction from the user (for example, duplication printing etc.) at the user interface 104. Upon receipt of the output instruction, the control unit 101 commands the reading unit 102 to read the original document.

In step 908, the reading unit 102 reads the original document set on the document table etc. and generates a document image (image data). The generated document image is sent to the memory unit 106 and the information generating unit 103. The document image sent to the memory unit 106 is subjected to necessary image processing according to the output instruction of the user (for example, halftoning in the case of duplication printing etc.) by an image processing unit, not shown schematically.

In step 909, the control unit 101 determines again whether or not the contents of QR Code Detection Setting acquired in step 902 are "Disable". When the setting contents are determined to be "Disable", the procedure proceeds to step 910. In contrast, when determined to be "Enable", the procedure proceeds to step 915.

In step 910, the control unit 101 reads and acquires the contents of Output Security Setting from the RAM of the memory unit 106.

In step 911, the control unit 101 determines whether or not "Add QR code at the time of output" is set in the acquired contents of "Output Security Setting". When "Add QR code at the time of output" is set, the procedure proceeds to step 912. In contrast, when "Don't add QR code at the time of output" is set, the procedure proceeds to step 924.

In step 912, the control unit 101 reads and acquires the contents of Operation Restriction Setting at the time of [Disable] in QR Code Detection Setting.

In step 913, the control unit 101 determines the setting contents of Operation Restriction at the time of [Disable] in QR Code Detection Setting acquired in step 912. That is, the control unit 101 determines whether or not the contents of Operation Restriction are "Set [Enable] in QR Code Detection Setting when QR code addition is set" or "Cancel output when QR code addition is set". When "Set [Enable] in QR Code Detection Setting when QR code addition is set" is set, the procedure proceeds to step 914. When "Cancel output when QR code addition is set" is set, the processing is terminated without performing the output instructed by the user.

In step 914, the control unit 101 temporarily changes the contents of "QR Code Detection Setting" from "Disable" to "Enable". Due to this, as to the processing relating to the output instruction in step 907, the operation mode of detecting a QR code is entered provisionally.

In step 915, the information generating unit 103 performs detection processing of a QR code on predetermined region as a target of the document image generated in step 908 and obtains embedded information from the detected QR code. The processing in this step is designed so as to be performed N times normally (for example, 20 times), and thus, N pieces of embedded information are obtained at the maximum. When no QR code is added to the document image or no finder pattern is detected because the document image is broken considerably, embedded information is not obtained.

In step 916, the control unit 101 determines whether or not embedded information is obtained by the processing in step 915. When embedded information is obtained, the procedure proceeds to step 917. In contrast, when no embedded information is obtained, the procedure proceeds to step 920.

In step 917, the control unit 101 decodes all the pieces of embedded information and acquires output control information.

In step 918, the control unit 101 determines whether or not decoding of embedded information has succeeded. When decoding has succeeded, the procedure proceeds to step 919. When decoding has failed, the processing is terminated without performing the output instructed by the user.

In step 919, the control unit 101 determines whether or not the information obtained by decoding is "output inhibition information". When the information obtained is output inhibition information, the processing is terminated without performing the output instructed by the user. In contrast, when the information obtained is not "output inhibition information" (that is, "output permission information"), the procedure proceeds to step 920.

In step 920, the control unit 101 acquires the setting contents of "Output Security Setting". When the setting contents have already been acquired in the previous step 910, this processing is skipped.

In step 921, the control unit 101 determines whether or not "Add QR code at the time of output" is set in the contents of Output Security Setting. When "Add QR code at the time of output" is set, the procedure proceeds to step 922. In contrast, when "Don't add QR code at the time of output" is set, the procedure proceeds to step 924.

In step 922, the encoding unit 109 generates a QR code according to the contents of Output Security Setting. As described above, the contents of the latest information within the tracking information included in a QR code to be generated are those updated based on the user ID at the time of login authentication, the contents of instruction in step 907, etc.

In step 923, the control unit 101 combines the document image generated in step 908 and the QR code generated in step 922. At this time, if embedded information is acquired in step 916 (QR code is detected from the original document), a new QR code is combined at the same position or the print position specified in Output Security Detail Setting. For example, in the former case (combined at the same position as the original QR code), the image data of the generated QR code is overwritten at the same position as the QR code detected in step 915. At the time of this combination, the entire background part (normally white) including part of the peripheral region of the original QR code is overwritten, and thus there do not take place the previous QR code in the original document and the new QR code overlap, and thus the QR code becomes blurred. Similarly, also in the latter case (the new QR code is combined at the position specified in "Output Security Detail Setting"), when the new QR code is arranged, the original QR code is erased at the same time (the original QR code and its peripheral region are blotted out in the background color). Therefore, the state where the new and old QR codes coexist is not brought about.

When embedded information is not acquired in step 916 (the QR code is not detected or the QR code is detected but generation of information has failed), the image data of the QR code is combined at the print position specified in Output Security Detail Setting.

In step 924, the output unit 108 starts the output of the document image according to the contents of output instructed in step 907.

In step 925, the control unit 101 determines whether or not there is another original document to be subjected to processing. When it is determined that there is another original document to be subjected to processing, the procedure returns to step 908 and each processing described above is repeated. When it is determined that there is no original document to be subjected to processing, the processing is terminated.

As described above, according to the image forming apparatus according to the present embodiment, when execution of various outputs is instructed in the operation mode of not detecting an encoded image, from the original document, it is possible to prevent the occurrence of a state where a document to which encode images of contradictory contents are added is created, before it occurs.

Second Embodiment

Next, as a second embodiment, an image forming apparatus including an operation mode of enabling output by ignoring the contents of a QR code attached to the original document (output control information ignoring mode) when the QR code detection function is enabled will be explained.

When the operation mode of the image forming apparatus is set to the output control information ignoring mode, it becomes possible to duplicate a document to which a QR code is attached even if the contents of output control information are output inhibition information. It is assumed that in the output control information ignoring mode, for example, a user sets in Output Security Setting so that a QR code of output permission information is added when instructing to perform duplication printing. If the contents of the QR code added to the original document are output inhibition information, there may take place a QR code of output permission information is added newly to the duplicated document in addition to the original QR code of output inhibition information.

Because of the above, in the present embodiment, such output control as described below is performed in order to prevent the occurrence of such a state. Before explaining specific output control, the setting of the output control information ignoring mode will be explained.
(Setting of Output Control Information Ignoring Mode)

Figure 10:
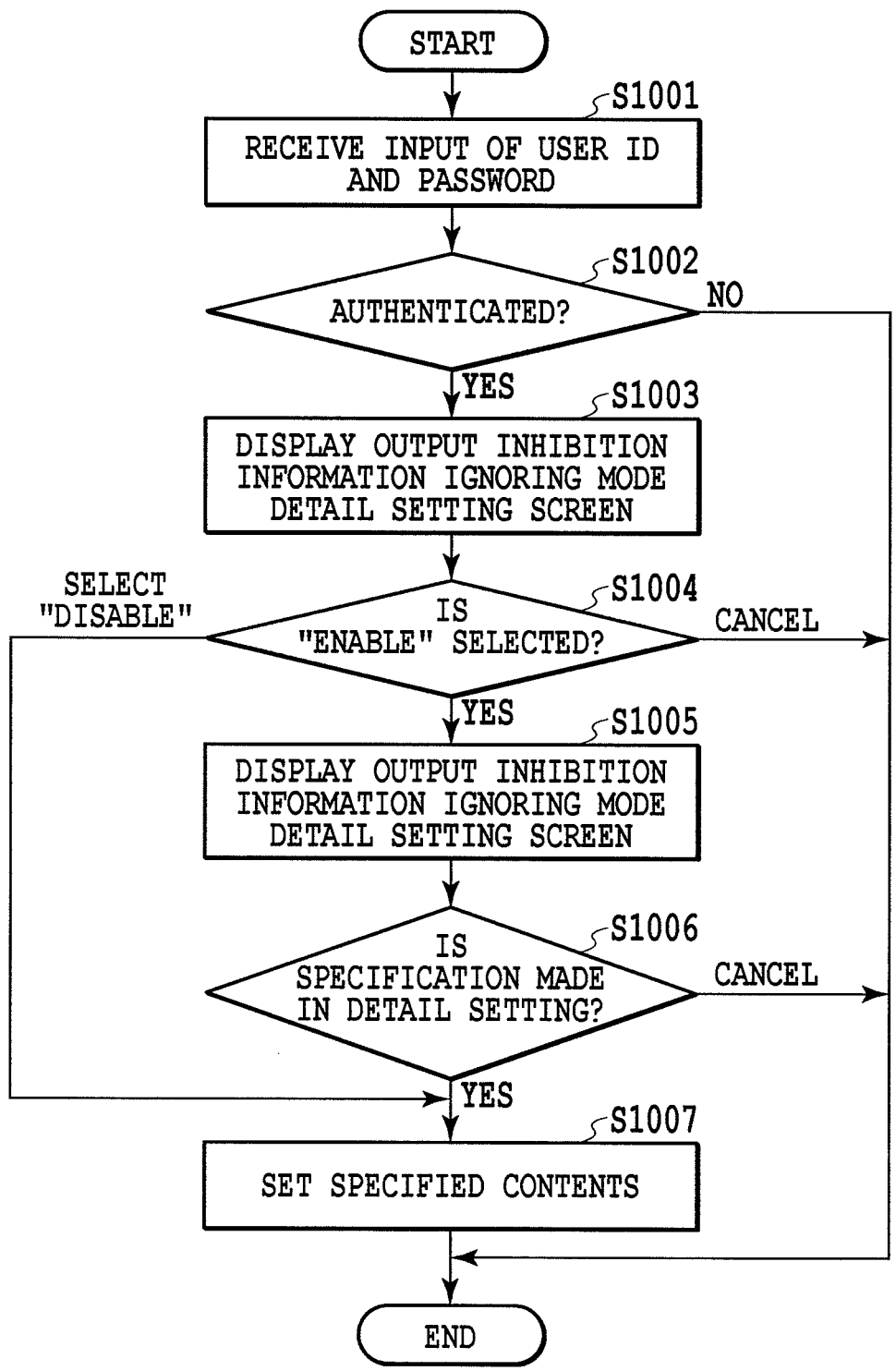
FIG. 10 is a flowchart showing a flow of setting processing in an output inhibition information ignoring mode.

FIG. 10 is a flowchart showing a flow of processing when setting the image forming apparatus to the output control information ignoring mode. It should be noted that this processing is also realized by the CPU within the control unit 101 executing programs read from the ROM into the RAM. It is necessary to ignore the contents of a QR code when the output control information is output inhibition information, and thus this operation mode is referred to as an "output inhibition information ignoring mode" below.

The setting of the output inhibition information ignoring mode is permitted only to a specific user (administrator) having the particular right, like in the case of QR Code Detection Setting in the first embodiment.

When the administrator selects a screen for performing the setting on the user interface 104, the control unit 101 displays a screen (not shown schematically) to prompt a user to input his/her user ID and password on the user interface 104 and receives an input by the user. The information that is input is sent to the user authenticating unit 105.

In step 1002, the user authenticating unit 105 performs user authentication by using the input user ID and password and determines whether or not the user is an appropriate user having the right to change the contents of Output Inhibition Information Ignoring Mode Setting. When the user is determined to be an appropriate user having the right, the user authenticating unit 105 transmits the user ID and password to the control unit 101 and the procedure proceeds to step 1003. When the user is determined to be a user not having the right, this processing is exited.

Figure 11:
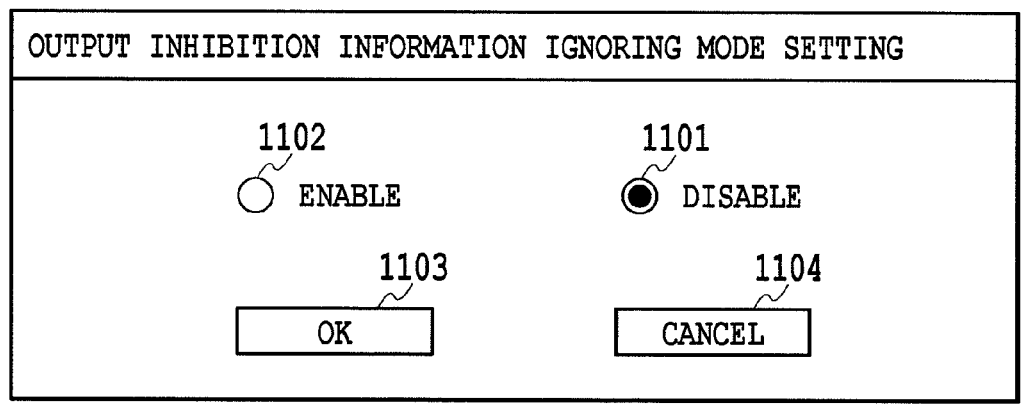
FIG. 11 is a diagram showing an example of an "Output Inhibition Information Ignoring Mode Setting" screen.

In step 1003, when the contents of output control information is output inhibition information, the control unit 101 displays an "Output Inhibition Information Ignoring Mode Setting" screen for specifying whether or not to ignore the information on the display unit of the user interface 104. FIG. 11 shows an example of the Output Inhibition Information Ignoring Mode Setting screen. When the setting of the operation mode of ignoring output inhibition information is desired, a user is required to check a check box 1102 of "Enable" and press an "OK" button 1103 because a check box 1101 of "Disable" is checked as a default.

In step 1004, the control unit 101 determines whether or not the check box 1102 of "Enable" is selected. When "Enable" is selected, the procedure proceeds to step 1005 and when "Disable" is selected, the procedure proceeds to step 1007. In contrast, when a Cancel box 1104 is selected, this processing is exited.

In step 1005, the control unit 101 displays an "Output Inhibition Information Ignoring Mode Detail Setting" screen for making detail setting at the time of the operation mode of ignoring output inhibition information, on the display unit of the user interface 104 and receives an instruction of the user.

Figure 12:
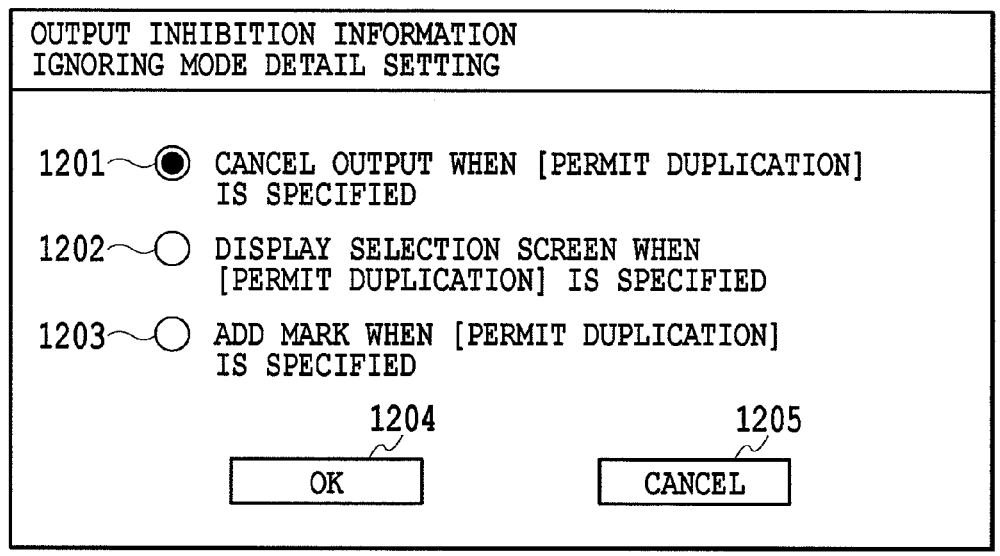
FIG. 12 is a diagram showing an example of an "Output Inhibition Information Ignoring Mode Detail Setting" screen.

FIG. 12 shows an example of the Output Inhibition Information Ignoring Mode Detail Setting screen. It is possible for the user to specify, as follows, output control when ignoring output inhibition information by selecting any of check buttons 1201 to 1203.

When "Cancel output when [Permit duplication] is specified" of the check button 1201 is selected, if "Permit duplication" is selected in the setting of "Contents of control" in "Output Security Detail Setting", the setting is made so that all the output operations are aborted. That is, when "Enable" is effectively set in "Output Inhibition Information Ignoring Mode Setting" and the QR code of output inhibition information is added to the original document, as long as "Permit duplication" is selected in "Output Security Setting", all the outputs of duplication etc. are disabled.

When "Display selection screen when [Permit duplication] is specified" of the check button 1202 is selected, the setting is made so that a selection screen to prompt a user to select whether or not to continue the output is displayed on the display unit of the user interface 104. That is, when "Enable" is set in "Output Inhibition Information Ignoring Mode Setting" and the QR code of output inhibition information is added to the original document, the message to the effect that the contents of the QR code cannot be changed to [output permitted] is shown to the user. Due to this, the user is prompted to select whether to perform duplication etc. while [output inhibited] is set or whether to abort duplication etc. FIG. 13 shows an example of the selection screen, where a message that "Output is performed while the contents of output control information are [output inhibited]. OK?" is displayed and a user is prompted to select thereon.

Figure 14:
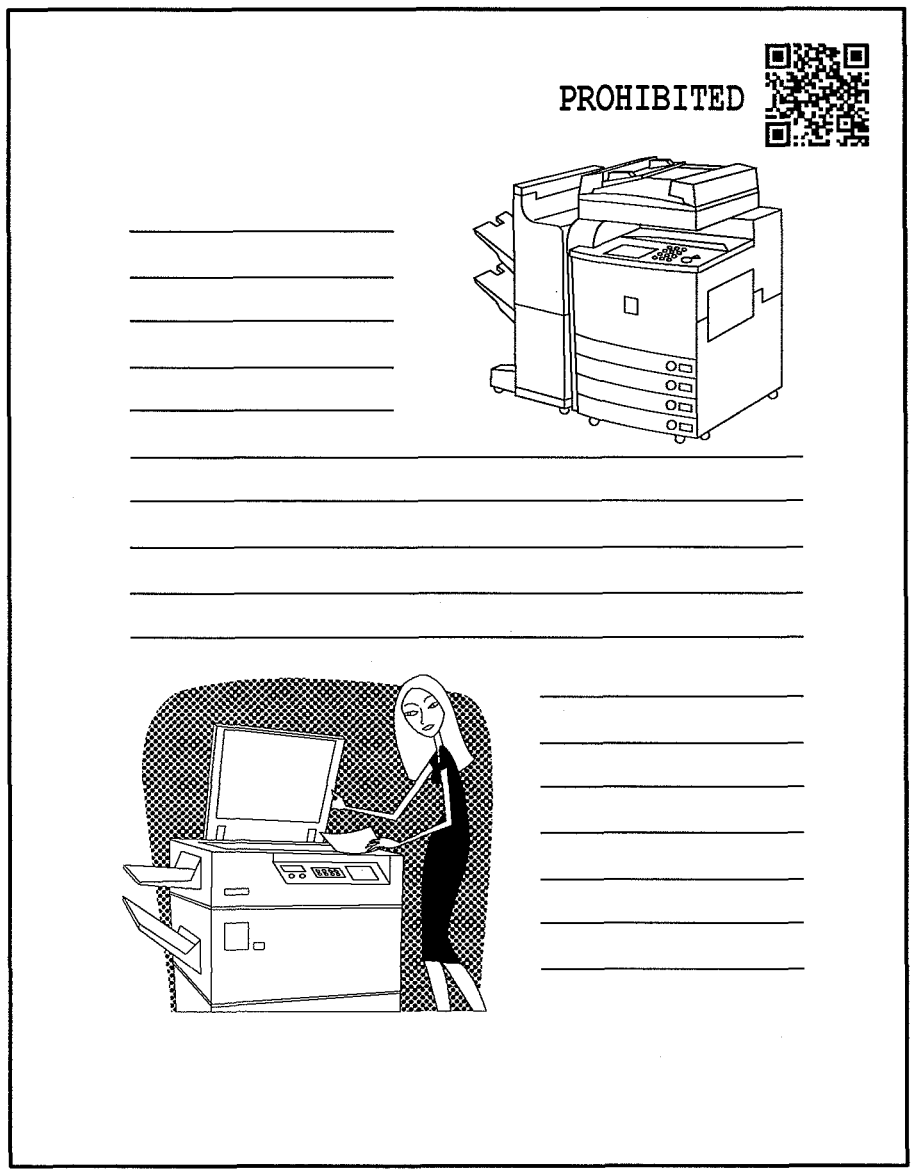
FIG. 14 is a diagram showing an example of a document image to which a mark is added along with a QR code.

When "Add mark when [Permit duplication] is specified" is selected, the setting is made so that a mark indicating that duplication etc. is inhibited is added to a document image to be output and then the output is performed. That is, when "Enable" is set in "Output Inhibition Information Ignoring Mode Setting" and the QR code of output inhibition information is added to the original document, even if the instruction to change the contents of output control information to [output permitted] is issued, a document image to which the QR code of [output inhibited] is added is generated. Then, the document image is output with a mark indicative of the above-described fact added to an arbitrary position thereof. FIG. 14 shows an example of a document image to which a mark is added, in which the word "Inhibited" indicating that duplication etc. is inhibited is printed to the left of the QR code. As described above, a mark indicating that the QR code is that of output inhibit information is added to the document together with the QR code, and thus it is possible to explicitly indicate the fact that a QR code of contents different from those intended is added, to the user.

In step 1006, the control unit 101 determines whether or not specification is made in "Output Inhibition Information Ignoring Mode Detail Setting". Specifically, the control unit 101 determines whether or not any of the check buttons 1201 to 1203 is checked and an "OK" button 1204 is pressed. When specification is made in "Output Inhibition Information Ignoring Mode Detail Setting", the procedure proceeds to step 1007. In contrast, when a "Cancel" button 1205 is pressed, this processing is exited.

In step 1007, the control unit 101 settles the contents of Output Inhibition Information Ignoring Mode Detail Setting in accordance with the contents specified by the user and stores the contents in the HDD 107. For example, when "Enable" is selected in step 1004 and "Cancel output when [Permit duplication] is specified" is specified in step 1006, the operation as described above is performed. That is, as long as the QR code of output inhibition information is added to the original document, the setting contents are settled so as to prevent a document to which the QR code of "Permit duplication" is added, from being output and the setting contents are stored in the HDD 107.

Like in the case of the setting contents in QR Code Detection Setting, once Output Inhibition Information Ignoring Mode Setting is performed, the contents thereof are maintained until a user having the right changes the setting contents the next time.

In the manner described above, Output Inhibition Information Ignoring Mode Setting is performed.

Next, the control of the output operation in the image forming apparatus according to the present embodiment will be explained.

Figure 15C:
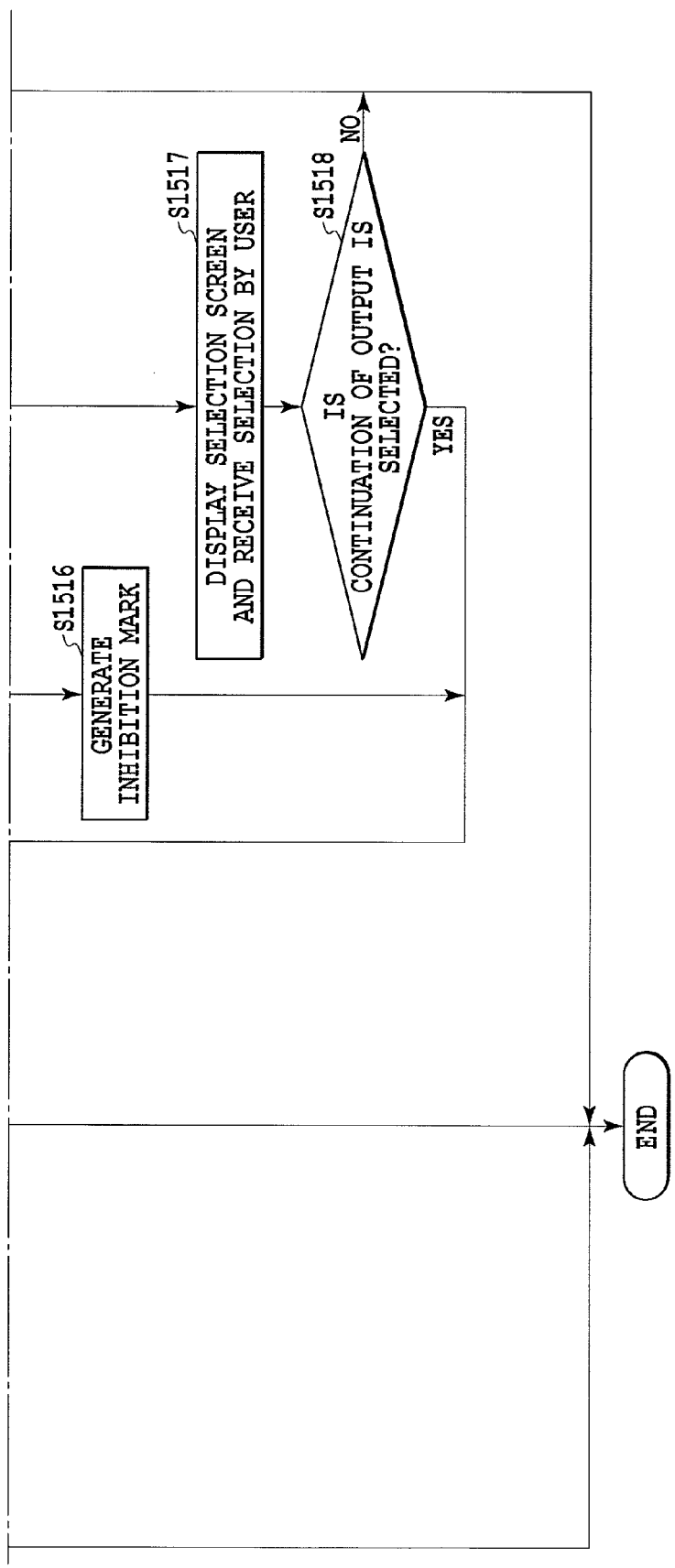
FIG. 15C is a flowchart showing a flow of control processing of an output operation of an image forming apparatus according to the second embodiment.

FIGS. 15A to 15C are flowcharts showing a flow of control processing of the output operation in the present embodiment. Explanation of the parts common to the flowchart in FIGS. 9A to 9C in the first embodiment is simplified or omitted and different points will be explained mainly here. This processing is also realized by the CPU within the control unit 101 executing programs read from the ROM into the RAM.

First, in step 1501, the control unit 101 performs user authentication processing. When the login authentication is determined to be OK, the procedure proceeds to step 1502.

In step 1502, the control unit 101 receives an output instruction from a user (for example, duplication printing etc.) at the operation unit of the user interface 104. Upon receipt of the output instruction, the control unit 101 commands the reading unit 102 to read the original document.

In step 1503, the reading unit 102 reads the original document set on the document table etc. and generates a document image. The generated document image is sent to the memory unit and the information generating unit 103.

In step 1504, the information generating unit 103 performs detection processing of a QR code on a predetermined region of the document image generated in step 1503 and obtains embedded information from the detected QR code.

In step 1505, the control unit 101 determines whether or not embedded information is obtained. When embedded information is obtained, the procedure proceeds to step 1506. In contrast, when embedded information is not obtained, the procedure proceeds to step 1509.

In step 1506, the control unit 101 decodes all the pieces of embedded information and acquires output control information.

In step 1507, the control unit 101 determines whether or not decoding of embedded information has succeeded. When decoding has succeeded, the procedure proceeds to step 1508. When decoding has failed, the processing is terminated without performing the output instructed by the user.

In step 1508, the control unit 101 determines whether or not the contents of output control information obtained by decoding are "output inhibition information". When the contents are "output inhibition information", the procedure proceeds to step 1511. In contrast, when the contents are not "output inhibition information" (that is, "output permission information"), the procedure proceeds to step 1509.

In step 1509, the control unit 101 acquires the setting contents of "Output Security Setting".

In step 1510, the control unit 101 determines whether or not "Add QR code at the time of output" is set in the setting contents of "Output Security Setting". When "Add QR code at the time of output" is set, the procedure proceeds to step 1519. In contrast, when "Don't add QR code at the time of output" is set, the procedure proceeds to step 1521.

In step 1511, the control unit 101 reads and acquires the contents of "Output Inhibition Information Ignoring Mode Setting" from the HDD 107 and determines whether or not the operation mode is "Enable". That is, when the contents of output control information are information for instructing to inhibit output, the control unit 101 determines whether or not the operation mode of ignoring this information is set. When "Enable" is set, the procedure proceeds to step 1512. In contrast, when "Disable" is set, the output inhibition information is observed as it is, and thus this processing is exited without performing output. Meanwhile, the acquisition itself of the contents of "Output Inhibition Information Ignoring Mode Setting" may be performed in a stage earlier than this step (for example, immediately after the user authentication in step 1501).

In step 1512, the control unit 101 acquires the contents of "Output Security Setting".

In step 1513, the control unit 101 determines whether or not "Permit duplication" is specified in the "Contents of control" in "Output Security Detail Setting" that is acquired.

When "Permit duplication" is specified, the procedure proceeds to step 1514. In contrast, when "Inhibit duplication" is specified, the procedure proceeds to step 1519.

In step 1514, the control unit 101 reads and acquires the contents of "Output Inhibition Information Ignoring Mode Detail Setting" from the HDD 107. That is, the control unit 101 acquires the specified setting contents relating to the subsequent operation control when "Permit duplication" is specified.

In step 1515, the control unit 101 confirms the contents of Output Inhibition Information Ignoring Mode Detail Setting. Specifically, the control unit 101 determines whether or not the setting contents are "Cancel output when [Permit duplication] is specified", "Display selection screen when [Permit duplication] is specified", or "Add mark when [Permit duplication] is specified". When "Cancel output when [Permit duplication] is specified" is specified, the processing is terminated without performing the output instructed by the user. When "Add mark when [Permit duplication] is specified", the procedure proceeds to step 1516. When "Display selection screen when [Permit duplication] is specified" is specified, the procedure proceeds to step 1517.

In step 1516, the control unit 101 generates image data of a mark (for example, the word "Inhibited") indicating that output is inhibited, for being added to the document image together with the QR code. After the mark is generated, the procedure proceeds to step 1519.

In step 1517, the control unit 101 displays the selection screen as shown in FIG. 13 on the display unit of the user interface 104 and receives selection by the user.

In step 1518, the control unit 101 determines whether or not continuation of output is selected. That is, when continuation of output by the document image to which the QR code of [output inhibited] is added is selected, the procedure proceeds to step 1519. In contrast, when abortion of output is selected, the processing is terminated.

In step 1519, the encoding unit 109 generates a QR code (image data) according to the setting contents in "Output Security Setting", the contents of selection in step 1518, etc. For example, when it is determined that "Inhibit duplication" is specified in step 1513, a QR code including output inhibition information is generated. When continuation of output is selected in step 1518, even if "Permit duplication" is specified in "Output Security Setting", a QR code including output inhibition information is generated. Furthermore, also when a mark indicating that output is inhibited is generated in step 1516, even if "Permit duplication" is specified in "Output Security Setting", a QR code including output inhibition information is generated. As in the case of the first embodiment, the contents of the latest information within the tracking information included in the QR code are updated based on the user ID at the time of the login authentication, the contents of instruction in step 1502, etc.

In step 1520, the control unit 101 combines the document image generated in step 1503 and the QR code generated in step 1519. In this case, when a mark indicative of inhibition of output is generated in step 1516, the mark is also combined together. The position where the QR code is arranged is the same as that explained in step 923 in FIG. 9C in the first embodiment.

In step 1521, the output unit 108 starts output of the document image according to the contents of output instructed in step 1502.

In step 1522, the control unit 101 determines whether or not there is another original document to be subjected to processing. When it is determined that there is still an original document to be subjected to processing, the procedure returns to step 1503 and each processing described above is repeated. When it is determined that there is no original document to be subjected to processing, the processing is terminated.

As described above, according to the image forming apparatus according to the present embodiment, when execution of various outputs is instructed in the output inhibition information ignoring mode of the QR code of the original document, it is possible to prevent the occurrence of a state where a document to which encoded images of contradictory contents are added is created. Furthermore, it is possible to suppress "duplication inhibition information" from being easily changed to "duplication permission information", and thus it is possible to maintain the security level of a document.

Other Embodiments

Aspects of the present invention can also be realized by a computer of a system or apparatus (or devices such as a CPU or MPU) that reads out and executes a program recorded on a memory device to perform the functions of the above-described embodiment(s), and by a method, the steps of which are performed by a computer of a system or apparatus by, for example, reading out and executing a program recorded on a memory device to perform the functions of the above-described embodiment(s). For this purpose, the program is provided to the computer for example via a network or from a recording medium of various types serving as the memory device (e.g., computer-readable medium).

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2011-013028, filed Jan. 25, 2011, which is hereby incorporated by reference herein in its entirety.

What is claimed is:

1. An apparatus comprising:
a display unit configured to display a setting screen for a user to select a setting as to whether to add a new encoded image to an image to be inputted by an input unit;
the input unit configured to input the image;
a searching unit configured to search the input image for an encoded image;
an adding unit configured to, if a user selects the setting to add a new encoded image, add the new encoded image to the input image; and
a control unit configured to control the display unit,
wherein, in a case where the searching unit finds the encoded image in the input image, the adding unit outputs the input image including the new encoded image but not including the found encoded image,
wherein, in a case where a setting of the searching unit to search for an encoded image is changed not to search for an encoded image based on a user's instruction, the control unit controls the display of the setting screen so that the setting to add the new encoded image cannot be selected by the user, and
wherein the searching unit, the adding unit, and the control unit are implemented by one or more processors.

2. The apparatus according to claim 1, wherein, in a case where the setting of the searching unit to search for the encoded image is changed not to search for the encoded image based on the user's instruction, the control unit controls the display unit to mask the setting to add the new encoded image.

3. The apparatus according to claim 1, wherein, in a case where the setting to add the new encoded image is selected by a user and the searching unit finds the encoded image, the adding unit outputs the input image including the new encoded image but not including the found encoded image.

4. The apparatus according to claim 3, further comprising a printing unit configured to print the input image which includes the new encoded image but does not include the found encoded image.

5. The apparatus according to claim 1, wherein, in the case where the searching unit finds the encoded image, the adding unit outputs the input image including the new encoded image by overwriting the found encoded image at the position where the found encoded image is located.

6. The apparatus according to claim 1, wherein the new encoded image, which is added in the case where the searching unit finds the encoded image in the input image, includes a part of the information in the found encoded image.

7. The apparatus according to claim 1, wherein the new encoded image, which is added in the case where the searching unit finds the encoded image in the input image, only includes information as to a first output user but does not include information as to a last output user included in the found encoded image.

8. The apparatus according to claim 1, wherein, in a case where the searching unit finds the encoded image in the input image and the encoded image does not contain output inhibition information, the adding unit outputs the input image including the new encoded image but not including the found encoded image.

9. The apparatus according to claim 1, wherein both the encoded image searched for by the searching unit and the new encoded image added by the adding unit are two-dimensional codes.

10. An apparatus comprising:
an input unit configured to input an image;
a searching unit configured to search the input image for an encoded image; and
an adding unit configured to add a new encoded image to the input image,
wherein, in a case where the searching unit finds the encoded image in the input image, the adding unit outputs the input image including the new encoded image but not including the found encoded image,
wherein, in a case where the searching unit does not search the input image for the encoded image, the adding unit does not add the new encoded image to the input image, and
wherein the searching unit and the adding unit are implemented by one or more processors.

11. The apparatus according to claim 10, further comprising a printing unit configured to print the input image including the new encoded image but not including the found encoded image.

12. The apparatus according to claim 10, wherein, in a case where the searching unit does not find the encoded image in the input image, the adding unit adds the new encoded image to the input image.

13. The apparatus according to claim 10, wherein, in a case where the searching unit finds the encoded image in the input image and the encoded image does not contain output inhibition information, the adding unit outputs the input image including the new encoded image but not including the found encoded image.

14. The apparatus according to claim 10, wherein both the encoded image searched for by the searching unit and the new encoded image added by the adding unit are two-dimensional codes.

15. A method comprising:
displaying a setting screen for a user to select a setting as to whether to add a new encoded image to an image to be inputted by an input unit;
inputting an image by the input unit;
searching the input image for an encoded image;
adding, if a user selects a setting to add the new encoded image, the new encoded image to the input image; and
controlling the display of the setting screen,
wherein, in a case where after searching, the encoded image has been found in the input image, the input image including the new encoded image but not including the found encoded image is output, and
wherein, in a case where a setting to search for an encoded image is changed not to search for an encoded image based on a user's instruction, the display of the setting screen is controlled so that the setting to add the new encoded image cannot be selected by the user.

16. The method according to claim 15, wherein, in a case where the setting to search for the encoded image is changed not to search for the encoded image based on the user's instruction, the setting to add the new encoded image is masked.

17. The method according to claim 15, wherein, in a case where the setting to add the new encoded image is selected by a user and the encoded image has been found in the input image, the input image including the new encoded image but not including the found encoded image is output.

18. The method according to claim 15, wherein, in the case where the encoded image has been found in the input image, the input image including the new encoded image added by overwriting the found encoded image at the position where the found encoded image is located is output.

19. The method according to claim 15, wherein the new encoded image which is added in the case where the encoded image has been found in the input image, includes a part of the information in the found encoded image.

20. A method comprising:
inputting an image by an input unit;
searching the input image for an encoded image; and
adding, if a user selects a setting to add a new encoded image, the new encoded image to the input image,
wherein, in a case where after searching, the encoded image has been found in the input image, the input image including the new encoded image but not including the found encoded image is output, and
wherein, in a case where searching the input image for the encoded image is not performed, adding the new encoded image to the input image is not performed.

21. The method according to claim 20, further comprising printing the image which is output,
wherein the image includes the new encoded image but does not include the found encoded image.

22. The method according to claim 20, wherein, in a case where the encoded image has not been found in the input image, the new encoded image is added to the input image.

23. A non-transitory computer readable storage medium storing a program for causing a computer to perform a control method comprising:
inputting an image by an input unit;
searching the input image for an encoded image; and
adding, if a user selects a setting to add an encoded image, a new encoded image to the input image, wherein, in a case where the encoded image has been found in the input image, the input image including the new encoded image but not including the found encoded image is output, and wherein, in a case where searching the input image for the encoded image is not performed, adding the new encoded image to the input image is not performed.

24. An apparatus comprising:

an input unit configured to input an image;

a detection unit configured to detect an encoded image including output control information in the input image;

an addition unit configured to add a new encoded image to the input image in which the encoded image has been detected;

an output unit configured to output the input image including the new encoded image; and a control unit configured to inhibit the output unit from outputting the input image in a case where output inhibition information is included as output control information of the encoded image detected in the input image and output permission information is specified as output control information to be included in the new encoded image to be added to the input image, and permit the output unit to output the input image including the new encoded image in a case where output permission information is included as output control information of the encoded image detected in the input image and output inhibition information is specified as output control information to be included in the new encoded image to be added to the input image, wherein the detection unit, the addition unit, and the control unit are implemented by one or more processors.

25. The apparatus according to claim 24, wherein the control unit performs the inhibiting and permitting in a case where a mode ignoring output control information is set.

26. The apparatus according to claim 24, wherein the control unit is configured to inhibit the output unit from outputting the input image including the new encoded image in the case where output inhibition information is included as output control information of the encoded image detected in the input image and output permission information is specified as output control information to be included in the new encoded image to be added to the input image.

27. The apparatus according to claim 24, wherein the addition unit adds the new encoded image to the input image in which the found encoded image has been erased.

28. The apparatus according to claim 24, wherein inhibiting and permitting is performed where a mode ignoring output control information is set.

29. The apparatus according to claim 24, wherein the input image that has been subjected to the adding is inhibited from being output in the case where output inhibition information is included as output control information of the encoded image detected in the input image and output permission information is specified as output control information to be included in the new encoded image to be added to the input image.

30. The apparatus according to claim 24, wherein the new encoded image is added to the input image from which the detected encoded image has been erased.

31. A method comprising:

inputting an image by an input unit;

detecting an encoded image including output control information in the input image;

adding, if a user selects a setting to add a new encoded image, the new encoded image to the input image in which the encoded image has been detected;

outputting the input image including the new encoded image;

inhibiting the input image from being outputted in a case where output inhibition information is included as output control information of the encoded image detected in the input image and output permission information is specified as output control information to be included in the new encoded image to be added to the input image; and permitting the input image to be outputted including the new encoded image in a case where output permission information is included as output control information of the encoded image detected in the input image and output inhibition information is specified as output control information to be included in the new encoded image to be added to the input image.

32. An apparatus comprising:

an inputting unit configured to input an input image;

a searching unit configured to search the input image for an encoded image;

a setting unit configured to set a setting as to whether the searching unit searches the input image for an encoded image;

an adding unit configured to, if a user selects a setting to add a new encoded image, add the new encoded image to the input image; and a determining unit configured to determine whether the adding unit adds the new encoded image to the input image according to the setting as to whether the searching unit searches the input image for an encoded image, wherein the searching unit, the setting unit, the adding unit, and the determining unit are implemented by one or more processors.

\* \* \* \* \*